Nov. 30, 1965 S. A. LATOS 3,220,787

TAPE RECORDER

Filed Nov. 24, 1961 2 Sheets-Sheet 1

INVENTOR.
Stephen A. Latos

BY Francis W. Crotty
Atty.

Nov. 30, 1965 S. A. LATOS 3,220,787

TAPE RECORDER

Filed Nov. 24, 1961 2 Sheets-Sheet 2

INVENTOR.
Stephen A. Latos
BY
Francis W. Crotty
Atty.

United States Patent Office 3,220,787
Patented Nov. 30, 1965

3,220,787

TAPE RECORDER

Stephen A. Latos, Park Ridge, Ill., assignor to Zenith Radio Corporation, a corporation of Delaware Filed Nov. 24, 1961, Ser. No. 154,626
6 Claims. (Cl. 312—71)

This invention relates to recording and reproducing devices. More particularly, it relates to apparatus for playing a record bearing member such as a tape housed in a cartridge.

There are numerous types of recording and reproducing equipment available and they may be readily divided into two classes. In the first class are those devices which employ two interchangeable reels and have a transport mechanism which moves the record, be it tape or wire, from reel to reel. In the second class there are those devices which employ magazines containing the records. The simplest of devices of the latter class employs a cartridge containing both a supply reel having the record wound thereon and a take-up reel for receiving the record as it is being played. A preferred device of the magazine type utilizes cartridges, individually having a record wound upon a supply reel therein in conjunction with a single take-up reel serving all cartridges that are played.

With the development of a recording cartridge containing only a supply reel which is approximately the size of a folded handkerchief, it has been possible to construct a recording and reproducing device for such cartridges which selectively transcribes one or a plurality of them. In devices which automatically transcribe a plurality of cartridges it is desirable to know the number of cartridges which remain to be transcribed. Unlike record changers where the number of records remaining to be played are observable by a listener, the cartridges remaining to be played are stored out of sight and suitable visual indication is highly desirable.

In the copending applications of Richard L. Rost, Serial No. 122,916, now Patent No. 3,105,645, Eugene J. Polley et al., Serial No. 122,930, now Patent No. 3,105,646, and Ralph Galke et al., Serial No. 122,715, now Patent No. 3,170,651, all assigned to the same assignee as the present invention there are described and claimed apparatus which are closely related to the present invention.

It is an object of this invention to provide new and improved reeling apparatus which automatically plays a plurality of pre-recorded tapes or wires contained in individual cartridges.

It is also an object of this invention to provide apparatus which indicates the number of cartridges remaining to be transcribed by the reproducing apparatus.

It is a further object of this invention to provide cartridge indicating apparatus of the type previously mentioned which is both inexpensive to manufacture and utilizes a minimum number of components.

In accordance with the invention the reeling apparatus which is employed for transcribing a plurality of flexible tapes, each respectively housed on separate supply reels comprises a bin having a major opening for accepting and storing the supply reels. An upwardly biased platform is movably positioned within the bin below the opening for supporting the supply reels and assumes a position corresponding to the number of supply reels within the bin. The apparatus further comprises a supply reel feeding mechanism including the platform for sequentially feeding one stored reel at a time from the bin and indicating means responsive to the position of the platform for providing a visual display of the number of supply reels remaining within the bin.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figure 1:
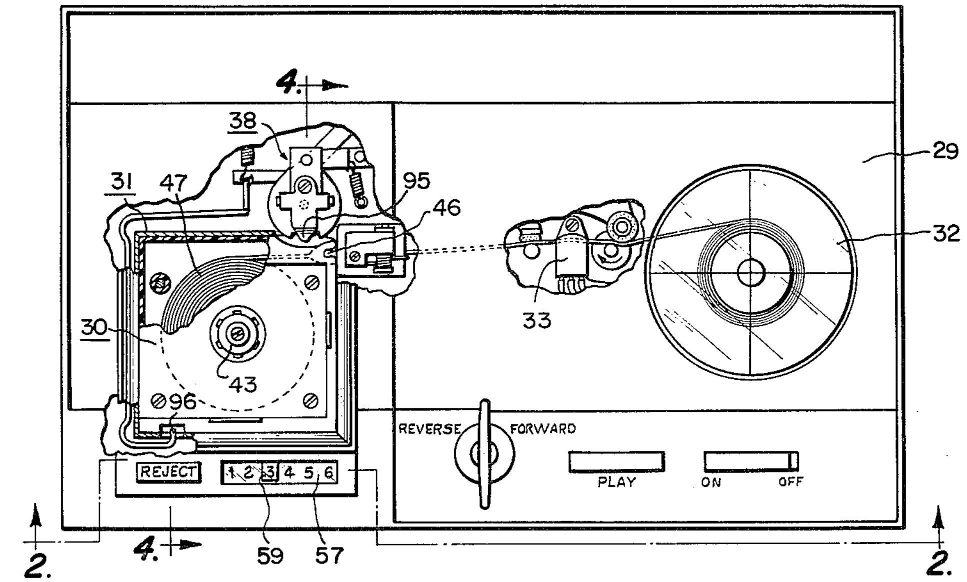
FIGURE 1 is a plan view, partly broken away, of apparatus embodying the invention.

The apparatus of FIGURE 1 may be used for transcribing tape, wire, or other flexible media, but, as illustrated, is employed for recording and reproducing on tape. The arrangement is a tape deck or transport which has, as major component parts, a top plate or cover 29, one or more cartridges 30 of tape, a storage bin 31 for accommodating such cartridges, a feeding mechanism comprising releasing means 38 and an upwardly biased bin platform 64 to present the cartridges seriatim to a playing position, a take-up arrangement including a reel 32 through which tape is presented in coupling or reeling relation to a magnetic transducing head 33, a driving system to effect winding of the tape as between the supply and take-up reels and a programming mechanism through which the several functions are properly correlated in a playing cycle. In addition, an indicating mechanism is provided to display the number of cartridges remaining to be transcribed within the bin. For convenience, cartridge 30, bin 31, the indicating mechanism, and a portion of the feeding mechanism will be described in detail herein; however, reference is hereby made to the previously mentioned copending applications for a detailed description of the structure and operation of the remaining components.

*Tape cartridge*

Figure 2:
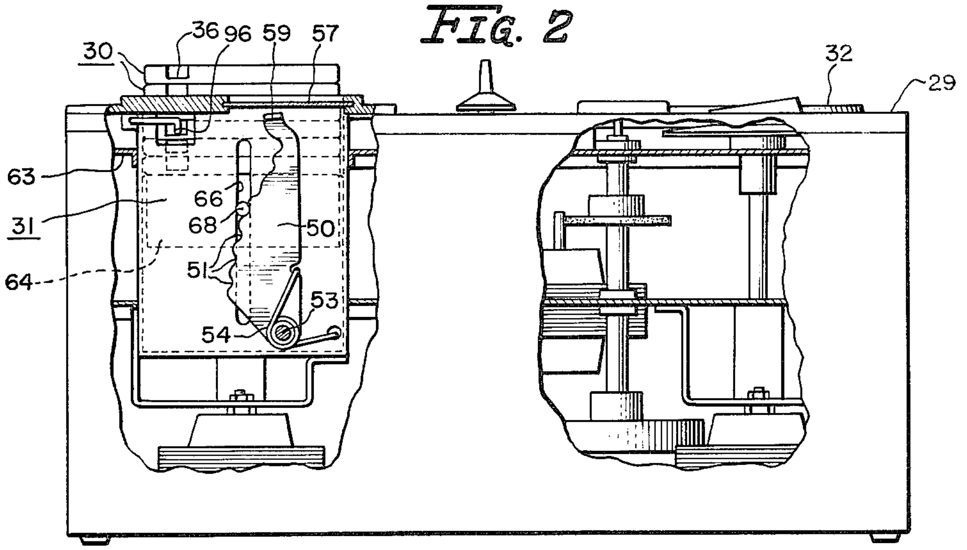
FIGURE 2 is a fragmentary cross-sectional view taken along lines 2—2 of FIGURE 1.
Figure 3:
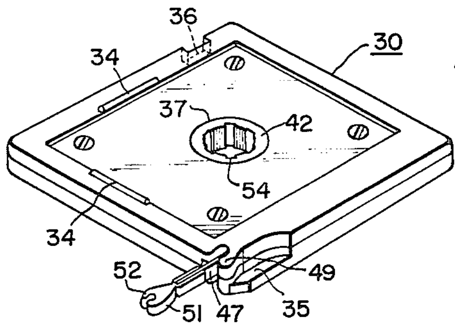
FIGURE 3 is a perspective view of the cartridge of the type preferably employed with the apparatus of FIGURE 1.

The tape cartridge 30 may take any of a variety of specifically different configurations, a suitable one being represented in FIGURE 3. In addition to being a vehicle for program tape, the cartridge is to satisfy other important requirements. Since it is contemplated that the machine may accommodate one or a series of cartridges within storage bin 31, the abutting or contiguous surfaces of successive cartridges arranged in a stack should preferably have provisions to facilitate their nesting with respect to one another in a stable stack as shown in FIGURE 2. It is also desirable that the cartridge be formed to facilitate the sequential feed of a group of cartridges to a playing position within bin 31 and additionally, it is preferred that the cartridge have a brake which precludes the unwinding of the tape when the cartridge is stored.

As represented, the cartridges are formed of a pair of essentially rectangular rigid plates with a peripheral flange of such depth that the plates, superposed with their flanges in mating engagement, define a cavity to accommodate the desired number of convolutions of the magnetic tape of a specified width. Machine screws may retain the plates in assembled relation. The projections 34 on the top surface of one cartridge face may be received by complementary recess portions in the bottom surface of another cartridge stacked on top of that illustrated in order to achieve an interlocking of the cartridges in a stack. The cartridge plates have a formed section at one side to define a shelf 35 which adapts the cartridge to a sequential feed mechanism comprising releasing means 38 and platform 64 presently to be considered in part. For balancing purposes, a generally similar shelf 36 is formed in the diametrically opposite portion of the cartridge. Each of the plates of the cartridge has a centrally located aperture 37 shown more clearly in FIGURES 4 and 5. A hub 42 is interposed between the plates and received within aperture 37. The inner diameter of the hub defines a channelway for accepting a spindle assembly 43, that is, for permitting the cartridge to be threaded over a spindle within the storage bin 31.

The free end of the magnetic tape 47 of the cartridge terminates in a coupler 51 which appears clearly in FIGURE 3, where for the purposes of illustration, a short section of tape 47 is shown withdrawn from the confines of the cartridge. The coupler has a bifurcated configuration which defines a channelway 52 into which a mating coupler or extractor 46, shown in FIGURE 1, may be inserted to couple tape 47 to the take-up reel 32. Normally, the tape is completely confined within the cartridge with channelway 52 in alignment with a similar channelway 49 formed in the corner of the cartridge.

Figure 5:
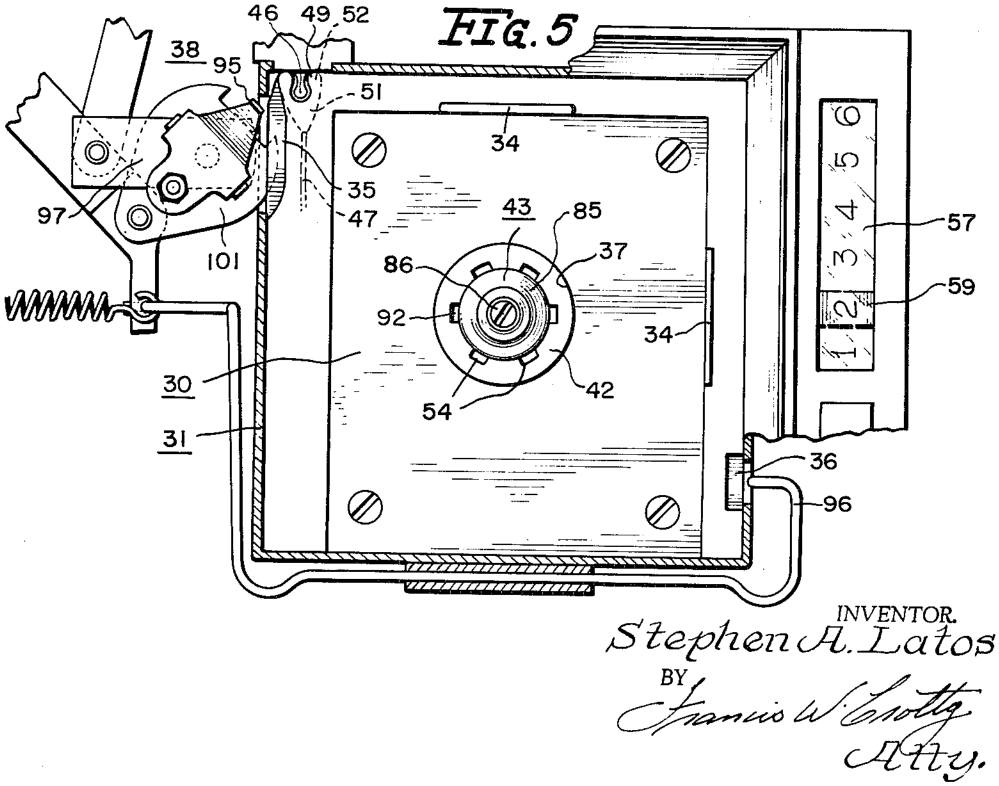
FIGURE 5 is a cross-sectional view taken along lines 5—5 of FIGURE 4.

As illustrated in FIGURES 3 and 5, the inner periphery of hub 42 bears a series of formed slots or keyways 54 which are the means through which a mechanical driving connection may be completed through the hub from the driving spindle.

*Storage bin*

Figure 4:
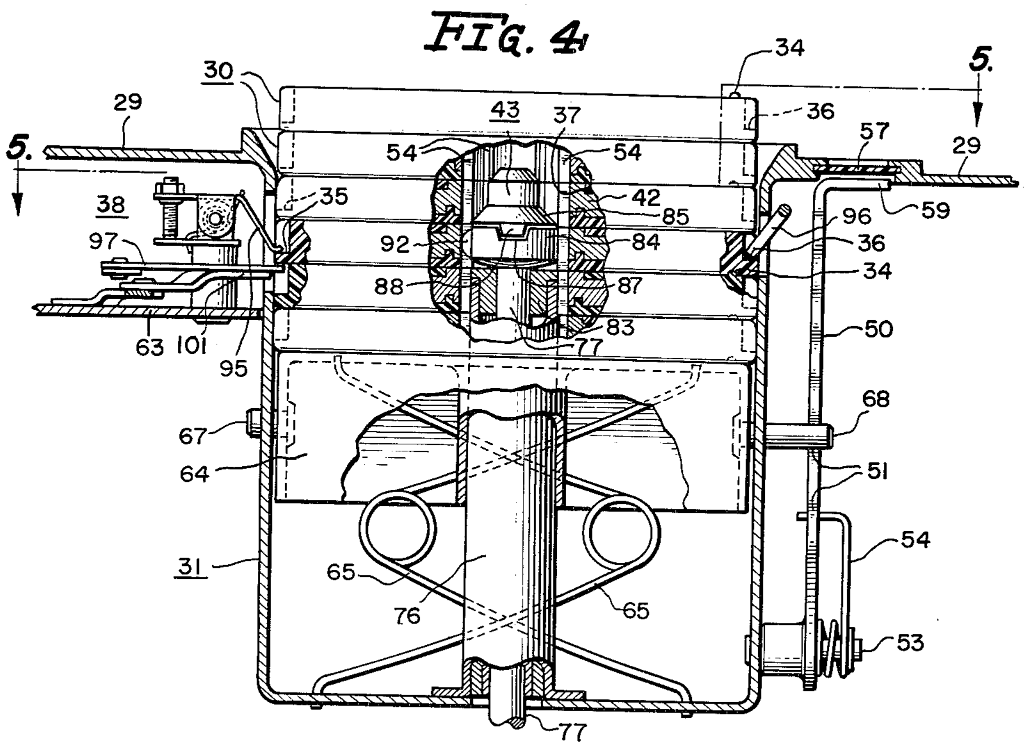
FIGURE 4 is a cross-sectional view taken along lines 4—4 of FIGURE 1.

The storage bin 31 is secured to a mounting deck 63 beneath cover 29 and is a generally rectangular cylinder dimensioned in form to accept one or more cartridges 30 with the cartridges horizontally disposed as represented in FIGURE 4. The cylinder or bin has a major opening at the top and has an upwardly biased platform 64 disposed below that opening for supporting the cartridges. The platform is normally biased in the direction of the open end by springs 65 but recedes toward the bottom of the well as cartridges are loaded into the bin. The platform assumes a position corresponding to the number of cartridges within the bin. Opposed sides of the bin have vertically disposed slots 66 only one of which is shown in FIGURE 2. Pins 67 and 68, the latter also serving as actuating means as will be discussed further hereinafter, extend horizontally from depending flange portions of platform 64 and ride in these slots or openings in the sides of the bin, using them as guides for the platform movement.

*Indicating mechanism*

Guide pins or actuating means 68 of the cartridge bin engages a pivotally supported lever 50 positioned for engagement with it. Lever 50 has a plurality of notches 51 corresponding to the number of cartridges which may be received by the bin 31 as shown in FIGURES 2 and 4. These notches or tooth-like projections are mutually spaced apart by a distance approximately equal to the thickness of one of the cartridges. Lever 50 is pivotally coupled to the bin by a support stud 53 at one of its ends and has an outwardly extending arm 59 at its other end. Biasing means or coil spring 54 which is coiled about stud 53 is affixed to a bin wall at one of its ends and is coupled to lever 50 at its other end to provide a constant force to insure that lever 50 is in engagement with pin 68. Positioned opposite the normal path of travel of arm 59 and mounted in an opening on top cover 29 is a numbered indicator plate 57 preferably constructed of a transparent material such as glass with numbers corresponding to the number of cartridges which may be accommodated by bin 31 painted thereon. Arm 59 may be conveniently painted a contrasting color so that it is readily visible through plate 57. These elements of the indicating mechanism form indicating means responsive to the position of the platform 64 for displaying the number of the supply reels within the bin.

*Spindle assembly*

In addition to serving as a container for the cartridges, bin 31, as shown in FIGURES 4 and 5, accommodates the spindle assembly 43 through which the hub of the cartridge in the playing position may be driven. The spindle assembly has a sleeve portion 76 which extends through most of the depth of the bin passing through a centrally located aperture in platform 64 to permit axial movement of the platform relative to the spindle. A drive spindle 77 is positioned within sleeve 76.

Stationary sleeve 76 is terminated at its upper end in a bearing 83 which has a centrally disposed aperture for receiving drive spindle 77. The upper surface of element 83 defines the general location of the playing position of the cartridges within the bin. Disposed immediately above the bearing surface of element 83 is a collar 84 and a cap 85 is placed over this collar. The cap is connected to the end of drive spindle 77 through a machine screw 86 and its end is tapered to facilitate the threading of cartridges thereover. The periphery of collar 84 is contiguous to end cap 85 has spaced opposed recesses 87 which receive a pair of depending drive fingers 88 only one of which is shown. This establishes a mechanical coupling from spindle 77 through cap 85 to collar 84 and slots 87 are slightly wider than drive fingers 88 so that there is relatively free driving connection between them. The obverse face of collar 84 is curved to rest on the bearing surface of element 85.

With this driving connection, cap 85 rotates collar 84 and at the same time permits movement of the collar about its curved bottom surface in a plane substantially transverse to the rotational axis of the drive spindle which contributes a self-aligning feature and permits the mechanism to accommodate cartridges which may have imperfections that in the absence of this freedom of transverse motion would tend to bind and stall the machine. A coil spring, not shown, interposed between collar 84 and cap 85 urges the collar into coaxial alignment with the spindle 77.

The described driving connection is extended from collar 84 to hub 42 of the cartridge instantaneously in the playing position by means of a pin 92 affixed to the collar and accepted by one of the slots 54 of the cartridge hub as shown in FIGURE 4. If drive pin 92 is not in alignment with a slot in the cartridge hub at the moment the cartridge is fed to the playing position, the pin which is of a crescent shape receds within collar 84 against the bias of an annular spring (not shown) upon which the pin is supported. When it is desirable to extend the mechanical driving connection of hub 42 of that particular cartridge, collar 84 rotates until pin 92 comes into alignment with one the slots 54. At that time, it enters the slot and completes the mechanical connection.

*Bin loading*

In describing the loading of cartridges into the bin, it will be assumed initially that there are no cartridges therein and that platform 64 is in its uppermost position. The mounting aperture of the first cartridge is slipped over cap 85 of the spindle assembly and pushed downwardly. If the cartridge is in proper alignment, the cartridge may be inserted further by pushing to overcome springs 65. Referring to FIGURES 4 and 5, as the cartridge is forced down over the spindle assembly, elements 95 and 96, which normally rest in the path of the cartridges, yield being deflected outwardly of the path by the passage of the cartridge itself. Once the cartridge has been inserted sufficiently to place shelves 35 and 36 thereof beneath the level of stop abutments 95 and 96, respectively, the downward pressure on the cartridge may be relaxed because the cartridge will now be retained within the bin. In will be retained at the playing level by the influence of platform 64 which urges the cartridge upwardly against the restraining effect of stop abutments 95 and 96 which overlie stop shoulders 35 and 36 once the cartridge has been inserted to a sufficient depth in the bin. A series of cartridges may be loaded in the same manner and stacked one upon another on the spindle assembly until as many as desired have been stored up to the capacity of the bin. The cartridges will be accepted in the bin only in that orientation which locates their coupler 51 properly to achieve a coupling connection with the companion coupler extractor 46 of FIGURE 1 when any stored cartridge is to be transcribed in a manner which is described in the previously mentioned copending applications. As indicated in FIGURE 4, there is an additional element 97 which may project into the bin to preclude adding cartridges during the time a particular cartridge is being transcribed. Lever 97 is controlled by a programming mechanism which is described in the previously mentioned copending applications and rests under shelf 35 of the cartridge instantaneously in a playing position throughout its play. At other times, however, lever 97 is withdrawn so that the feeding of cartridges may take place both into and out of the bin. For example, it is essential that lever 97 be retracted during a cartridge feed cycle and also during normal reject operations.

*Cartridge sequential feed*

A supply reel or cartridge feeding mechanism for sequentially feeding one stored reel at a time from the bin is provided on the apparatus.

The sequential presentation of cartridges stored within bin 31 to their playing position involves the retraction of stop abutments 95 and 96 to release the cartridge instantaneously in the playing position and at the same time the introduction of a third stop abutment 101 into the feed path of the cartridges so that the stack has restricted upward movement under the influence of platform 64 and its biasing springs 65. This movement is limited to advancing substantially only the thickness of one cartridge in each feed cycle. The mechanism for carrying out this process is shown in FIGURES 4 and 5. However, a more detailed description and discussion of the feed mechanism and its operation with respect to the overall operation of the transcribing apparatus will be found in the previously mentioned copending applications.

*Operation of the indicating mechanism*

As cartridges are inserted into bin 31, platform 64 is depressed downwardly carrying pin 68 with it as shown in FIGURE 4. As pin 68 moves downward it displaces lever 50 such that arm 59 moves to a position with respect to indicator plate 57 corresponding to the number of cartridges, three, within well 31. The combination of arm 59 and plate 57 provide a visual indication of the number of cartridges retained within the bin. As a cartridge is ejected from the bin, platform 64 moves upward under the influence of springs 65 carrying pin 68 with it. Coil spring 54 continues to bias lever 50 into engagement with pin 68 and thus arm 59 moves opposite the number 2 on plate 59. When no cartridges remain in the pin to be played, lever 50 is at a position such that arm 59 is not visible when plate 57 is observed. The tooth-like projections of lever 50 insure that lever 50 is positioned directly opposite the appropriate number on plate 57. It is apparent that other types of visual displays may be used in combination with lever 50.

Thus the invention provides a new and novel transport mechanism which may accommodate one or a plurality of tape cartridges. By employing the apparatus of the invention a visual indication of the number of cartridges remaining within the bin to be played is provided. The indicating mechansm is relatively simple and requires a minimum number of components.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. Reeling apparatus for transcribing a plurality of flexible tapes, each respectively housed on separate supply reels, said apparatus comprising:
   - a bin projecting downwardly from a supply reel transcription position and having a major opening for accepting and storing said supply reels concealed from view below said transcription position;
   - an upwardly biased platform movably positioned within said bin below said opening for supporting said supply reels and urging them upwardly toward said transcription position, said platform assuming a position corresponding to the number of supply reels within said bin;
   - a supply reel feeding mechanism including said platform for sequentially feeding one stored reel at a time from said bin to said transcription position;
   - and indicating means responsive to the position of said platform for providing a visual display of the number of said supply reels remaining within said bin.

2. Reeling apparatus for transcribing a plurality of flexible tapes, each respectively housed on separate supply reels, said apparatus comprising:
   - a bin projecting downwardly from a supply reel transcription position and having a major opening for accepting and storing said supply reels concealed from view below said transcription position;
   - an upwardly biased platform movably positioned within said bin below said opening for supporting said supply reels and urging them upwardly toward said transcription position, said platform assuming a position corresponding to the number of supply reels within said bin;
   - a supply reel feeding mechanism including said platform for sequentially feeding one stored reel at a time from said bin to said transcription position;
   - actuating means coupled to said platform;
   - and indicating means responsive to the position of said actuating means for providing a visual display of the number of said supply reels remaining within said bin.

3. Reeling apparatus for transcribing a plurality of flexible tapes, each respectively housed on separate supply reels, said apparatus comprising:
   - a bin projecting downwardly from a supply reel transcription position and having a major opening for accepting and storing said supply reels concealed from view below said transcription position and further having another opening in one of its sides;
   - an upwardly biased platform movably positioned within said bin below said opening for supporting said supply reels and urging them upwardly toward said transcription position, said platform assuming a position corresponding to the number of supply reels within said bin;
   - a supply reel feeding mechanism including said platform for sequentially feeding one stored reel at a time from said bin to said transcription position;
   - actuating means coupled to said platform and extending through said opening in the side of said bin;
   - and indicating means responsive to the position of said actuating means for providing a visual display of the number of said supply reels remaining within said bin.

4. Reeling apparatus for transcribing a plurality of flexible tapes, each respectively housed on separate supply reels, said apparatus comprising:
   - a bin projecting downwardly from a supply reel transcription position and having a major opening for accepting and storing said supply reels concealed from view below said transcription position and further having another opening in one of its sides;

an upwardly biased platform movably positioned within said bin below said opening for supporting said supply reels and urging them upwardly toward said transcription position, said platform assuming a position corresponding to the number of supply reels within said bin;

a supply reel feeding mechanism including said platform for sequentially feeding one stored reel at a time from said bin to said transcription position;

actuating means coupled to said platform and extending through said opening in the side of said bin;

and indicating means, including a pivotally supported lever positioned for engagement with said actuating means, for providing a visual display of the number of said supply reels remaining within said bin.

5. Reeling apparatus for transcribing a plurality of flexible tapes, each respectively housed on separate supply reels, said apparatus comprising:

a bin projecting downwardly from a supply reel transcription position and having a major opening for accepting and storing said supply reels concealed from view below said transcription position and further having another opening in one of its sides;

an upwardly biased platform movably positioned within said bin below said opening for supporting said supply reels and urging them upwardly toward said transcription position, said platform assuming a position corresponding to the number of supply reels within said bin;

a supply reel feeding mechanism including said platform for sequentially feeding one stored reel at a time from said bin to said transcription position;

actuating means coupled to said platform and extending through said opening in the side of said bin;

and indicating means, including a pivotally supported lever having a plurality of tooth-like projections mutually spaced apart by a distance approximately equal to the thickness of one of said supply reels and positioned for engagement with said actuating means, for providing a visual display of the number of said supply reels remaining within said bin.

6. Reeling apparatus for transcribing a plurality of flexible tapes, each respectively housed on separate supply reels, said apparatus comprising:

a bin projecting downwardly from a supply reel transcription position and having a major opening for accepting and storing said supply reels concealed from view below said transcription position and further having another opening in one of its sides;

an upwardly biased platform movably positioned within said bin below said opening for supporting said supply reels and urging them upwardly toward said transcription position, said platform assuming a position corresponding to the number of supply reels within said bin;

a supply reel feeding mechanism including said platform for sequentially feeding one stored reel at a time from said bin to said transcription position;

actuating means coupled to said platform and extending through said opening in the side of said bin;

indicating means, including a pivotally supported lever having a plurality of tooth-like projections mutually spaced apart by a distance approximately equal to the thickness of one of said supply reels and positioned adjacent said opening in said one side of said bin, for providing a visual display of the number of said supply reels remaining within said bin;

and means for biasing said lever into engagement with said actuating means.

References Cited by the Examiner

UNITED STATES PATENTS

| | | | |
|---|---|---|---|
| 2,122,060 | 6/1938 | Hondeville et al. | 221—28 |
| 2,331,549 | 10/1943 | Glawon | 222—47 X |
| 3,025,011 | 3/1962 | Camras | 242—55.13 |

LOUIS J. DEMBO, *Primary Examiner.*

LAVERNE D. GEIGER, EVERETT W. KIRBY, *Examiners.*